Figures 1, 2:
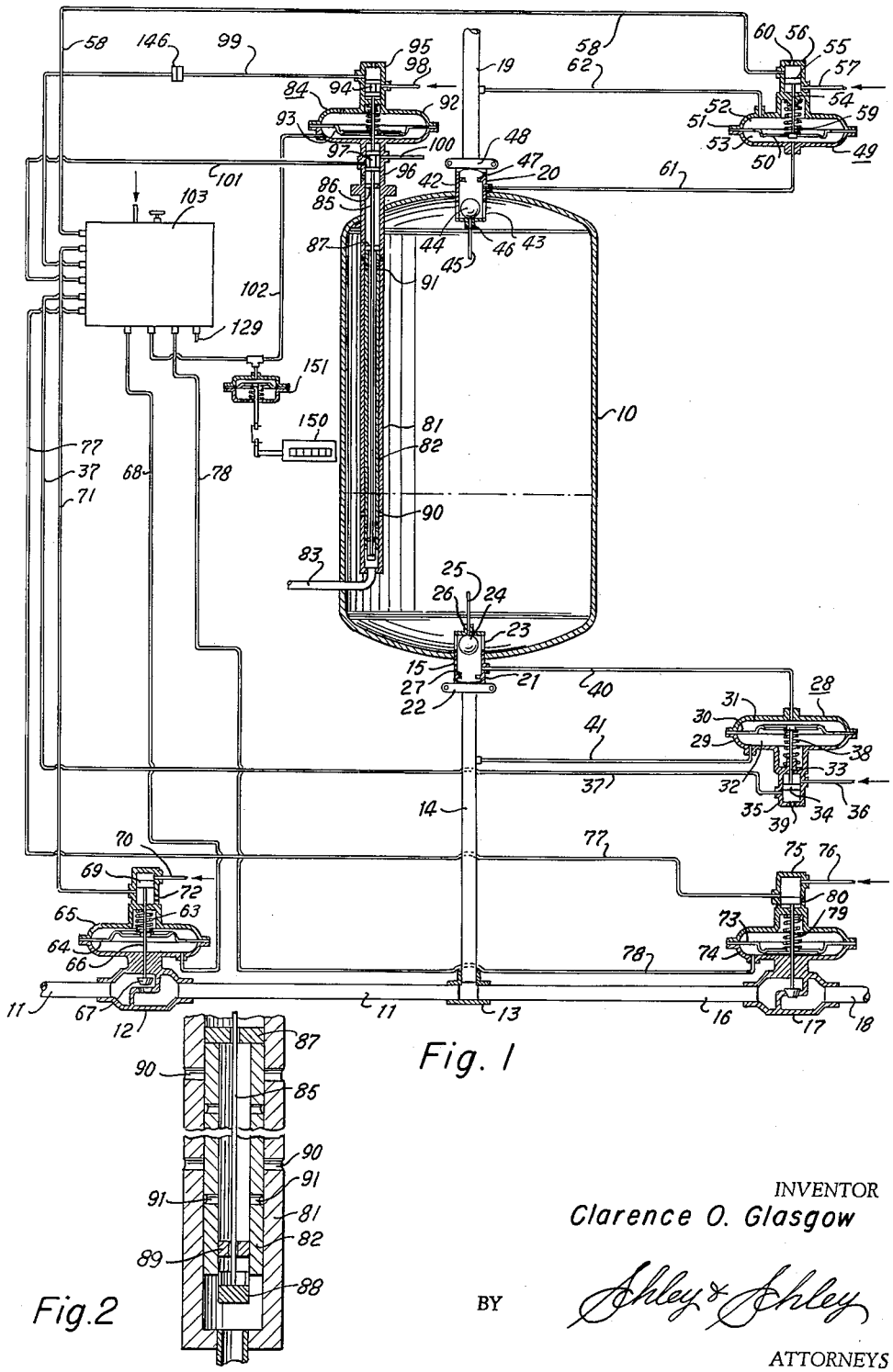

May 21, 1963 C. O. GLASGOW 3,090,230
METERING METHODS AND MEANS
Filed April 3, 1958 8 Sheets-Sheet 1

INVENTOR
Clarence O. Glasgow

BY
ATTORNEYS

May 21, 1963  C. O. GLASGOW  3,090,230
METERING METHODS AND MEANS
Filed April 3, 1958  8 Sheets-Sheet 2
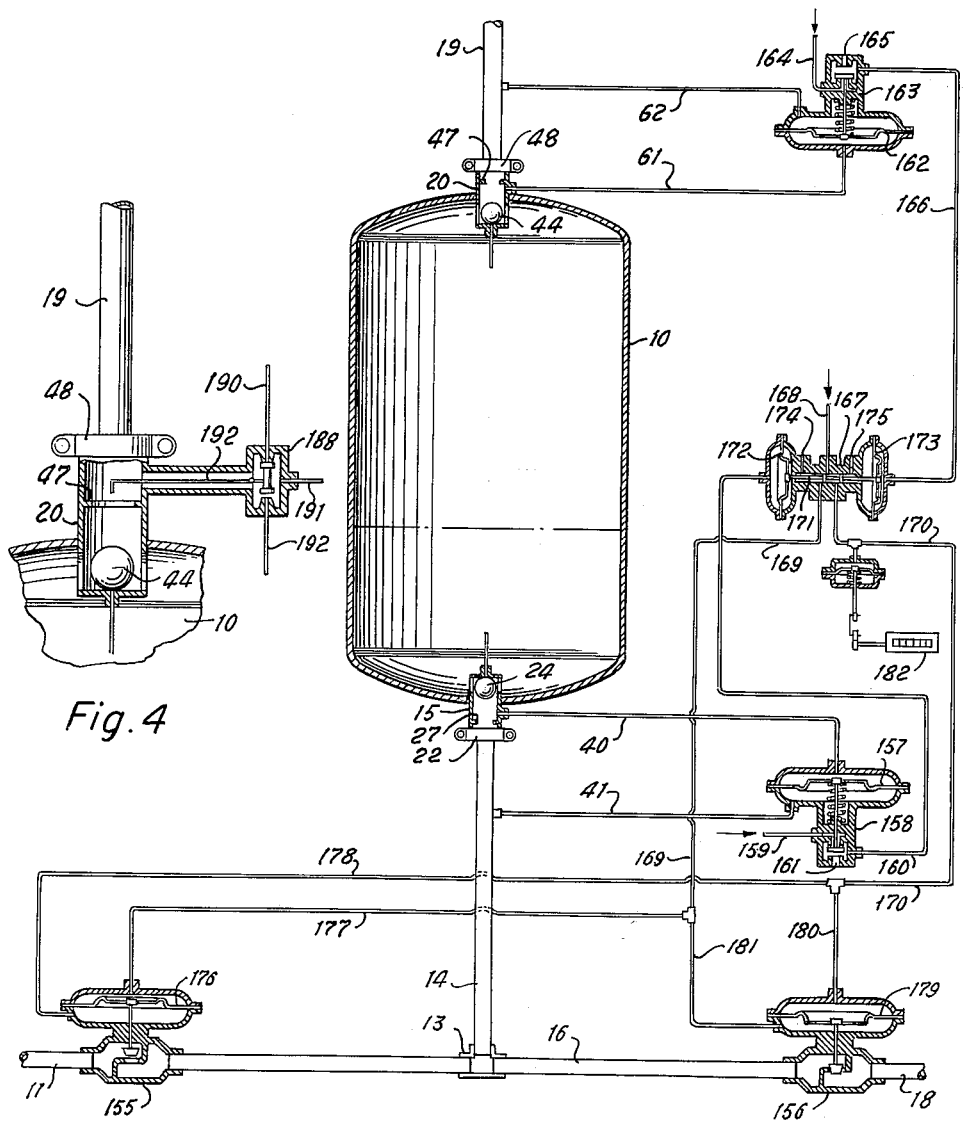
Fig. 4
Fig. 3
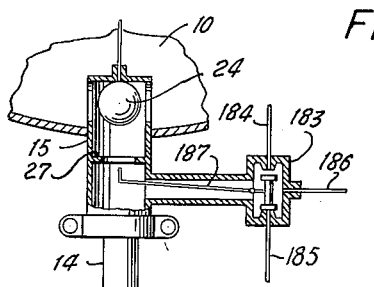
Fig. 5
INVENTOR
Clarence O. Glasgow
BY
ATTORNEYS INVENTOR
Clarence O. Glasgow
BY Ashley & Ashley
ATTORNEYS INVENTOR
Clarence O. Glasgow May 21, 1963 C. O. GLASGOW 3,090,230
METERING METHODS AND MEANS
Filed April 3, 1958 8 Sheets-Sheet 8

INVENTOR
Clarence O. Glasgow
BY
ATTORNEYS

United States Patent Office 3,090,230
Patented May 21, 1963

3,090,230
METERING METHODS AND MEANS
Clarence O. Glasgow, Tulsa, Okla., assignor to National Tank Company, Tulsa, Okla., a corporation of Nevada
Filed Apr. 3, 1958, Ser. No. 726,154
31 Claims. (Cl. 73—224)

This invention relates to new and useful improvements in metering methods and means and apparatus for controlling the operation thereof.

The invention is particularly concerned with structures for and methods of receiving petroleum well streams from a separator, emulsion treater, or other source, for automatically measuring the volume of such liquids while extracting a representative sample thereof, and for discharging measured quantities of the petroleum to a petroleum pipe line or other point of sale while retaining a permanent and accurate record of the volume of liquids passed through the structure.

In the past, it has been a standard practice in the oil fields to flow the recovered clean oil from a well or group of wells into storage tanks from which the oil is pumped or otherwise flowed to tank trucks, or more often, to petroleum pipe lines. In most instances, the actual sale of the petroleum fluids, insofar as the well operator is concerned, takes place when the oil is transferred from the storage or stock tanks, and it is therefore important that an accurate measure be maintained of the transferred oil both for the well operator or seller as well as for the pipe line operator or purchaser. Consequently, it has been the practice for both parties to employ personnel who manually gauge the storage tanks before and after transfer, and from the difference in levels in the tanks determine the quantity of oil which has been sold or transferred. Manifestly, this is a time and labor-consuming process, is relatively expensive insofar as wages are concerned, and is subject to the occurrence of human errors, or at least disagreement between the employees or representatives of the parties as to the quantity of oil actually transferred. The seemingly simple problem of determining arithmetically but correctly the differences in the oil levels in the stock tanks before and after transfer is, in actuality, a constant source of error and difficulty, and it is not unusual for the concern operating a large number of wells to be required to maintain rather extensive personnel simply for the purpose of checking calculations for the simplest of arithmetical mistakes. Here again, there has been a source of considerable expense and management difficulties.

Accordingly, the petroleum industry is adopting on a larger and larger scale various systems for automatically measuring and recording the quantity of oil which is transferred, the systems being completely automatic in operation and being referred to most often as automatic custody transfer systems on the basis that the systems automatically measure and transfer possession of the crude petroleum and keep a permanent and unassailable record of the volume of petroleum which has passed through the system. This invention is concerned with such systems and their methods of operation.

Virtually all of the known custody transfer systems operate on the basis of alternately filling and emptying a vessel of calibrated or known volume with a recording of the number of times the vessel is filled and emptied or the cycles of operation of the metering structure. In practice, however, it is difficult to fill and empty a vessel of appreciable size to exactly the same upper and lower levels for cycle after cycle, and accordingly, a principal object of this invention to provide an automatic petroleum metering and transfer system, and methods of operation thereof, in which highly accurate measuring is obtained and in which the metering vessel is repeatedly filled and emptied to almost exactly the same levels so as to produce a metering operation having an extremely small margin of error.

A further important object of the invention is to provide methods and means of the character described having a unique control system for carrying the metering structure through its metering cycle with complete automation whereby the attendance of operating personnel is seldom required and substantially trouble-free yet highly accurate operation is obtained.

Still another object of the invention is to provide methods and means of the character described wherein there is employed a unique sampling system for obtaining truly representative samples of each volume of liquid discharged from the system, such samples being essential for the keeping of accurate records to determine the water content of the oil as well as its gravity and other properties which can and do affect both the price received for the oil as well as its acceptability to the purchaser.

An additional object of the invention is to provide methods and means of the character described having novel control means for determining the level to which the metering vessel is filled whereby very precise and almost exact upper and lower levels are maintained so as to reduce to a minimum any possible variation or percentage of error as between consecutive fillings and emptyings of the metering vessel.

A further object of the invention is to provide methods and means of the character described in which the control means may be caused to operate the measuring system at predetermined intervals so that petroleum may be discharged into pipe lines or other points of sale at or during low load periods, or whereby several groups of wells may be caused to deliver their petroleum at staggered intervals so that all wells are not discharging into the pipe line at one time, and thus, a pipe line of smaller capacity may be employed for handling a much larger group of wells than might otherwise be possible.

Other and more particular objects will be available from a reading of the following specification and by examination of the drawings.

A construction designed to carry out the invention will be hereinafter described, together with other features of the invention.

Figure 6:
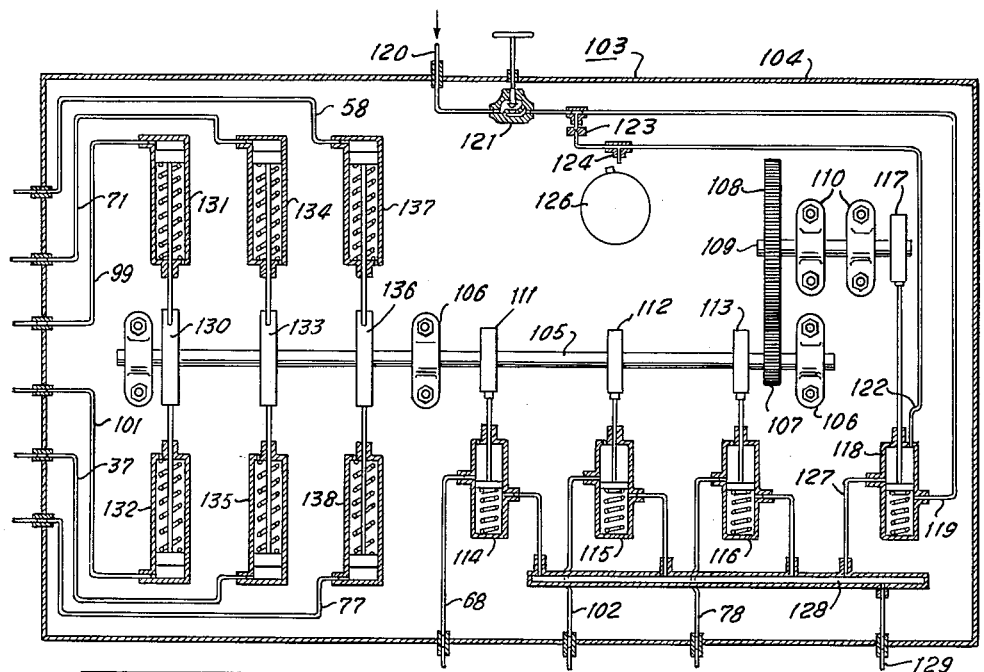
Figure 7:
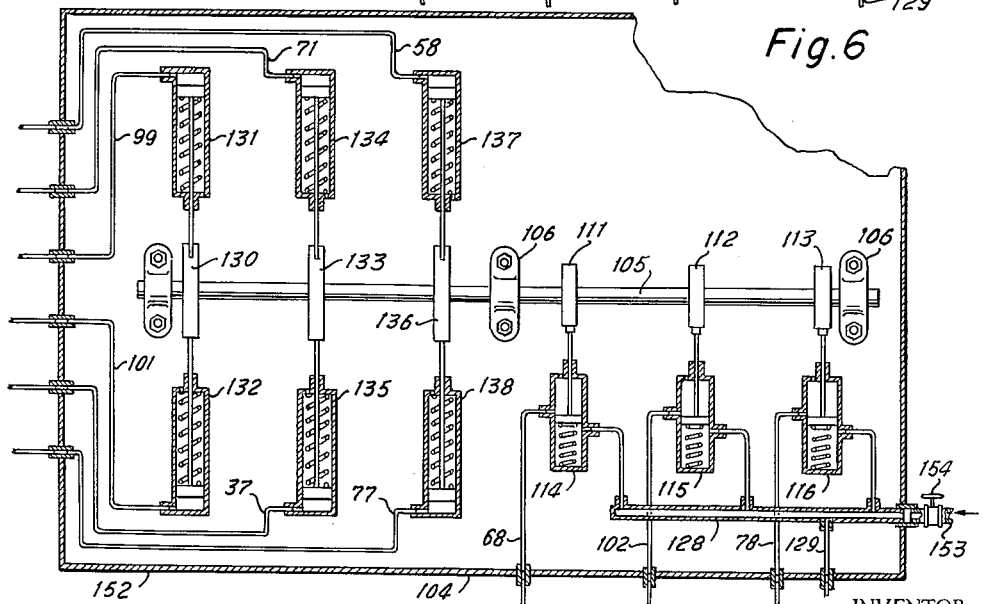
Figure 8:
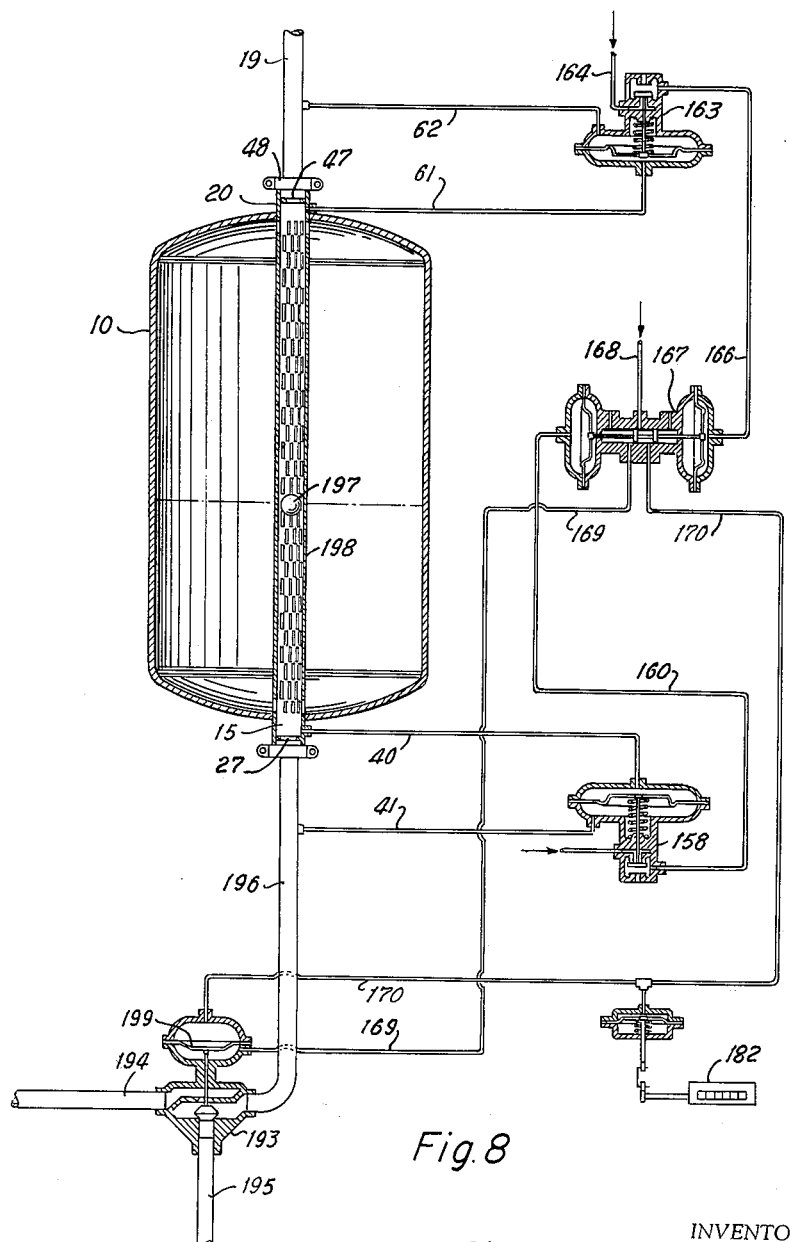
Figure 9:
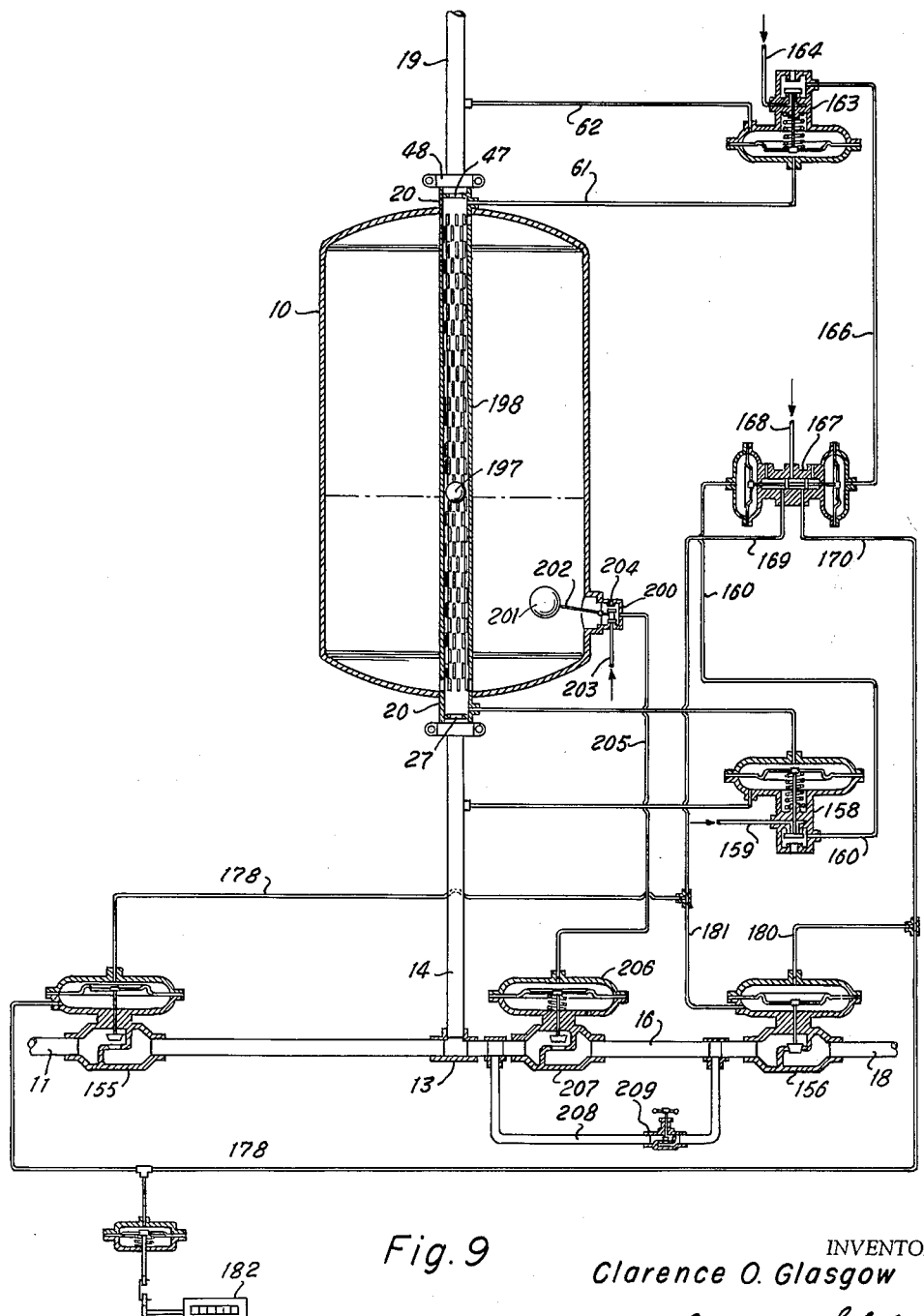
Figure 10:
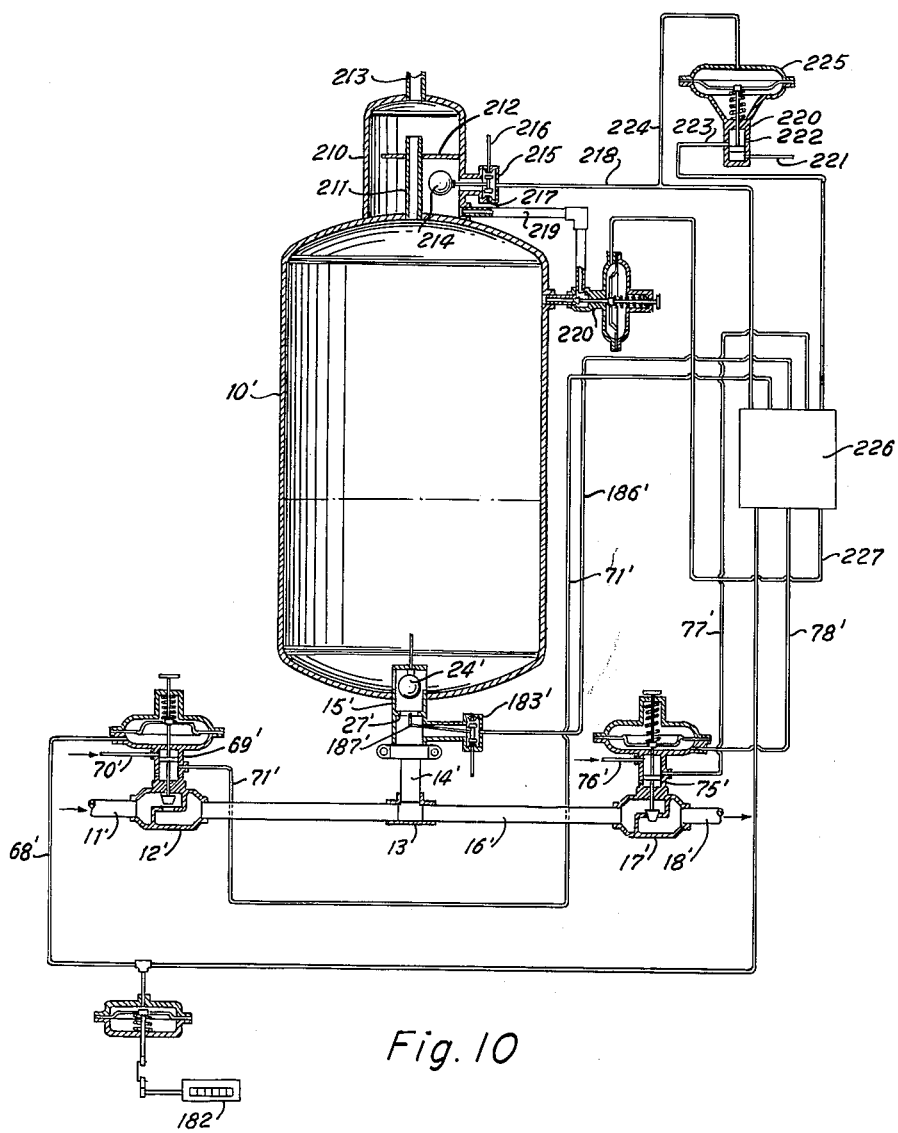
Figure 11:
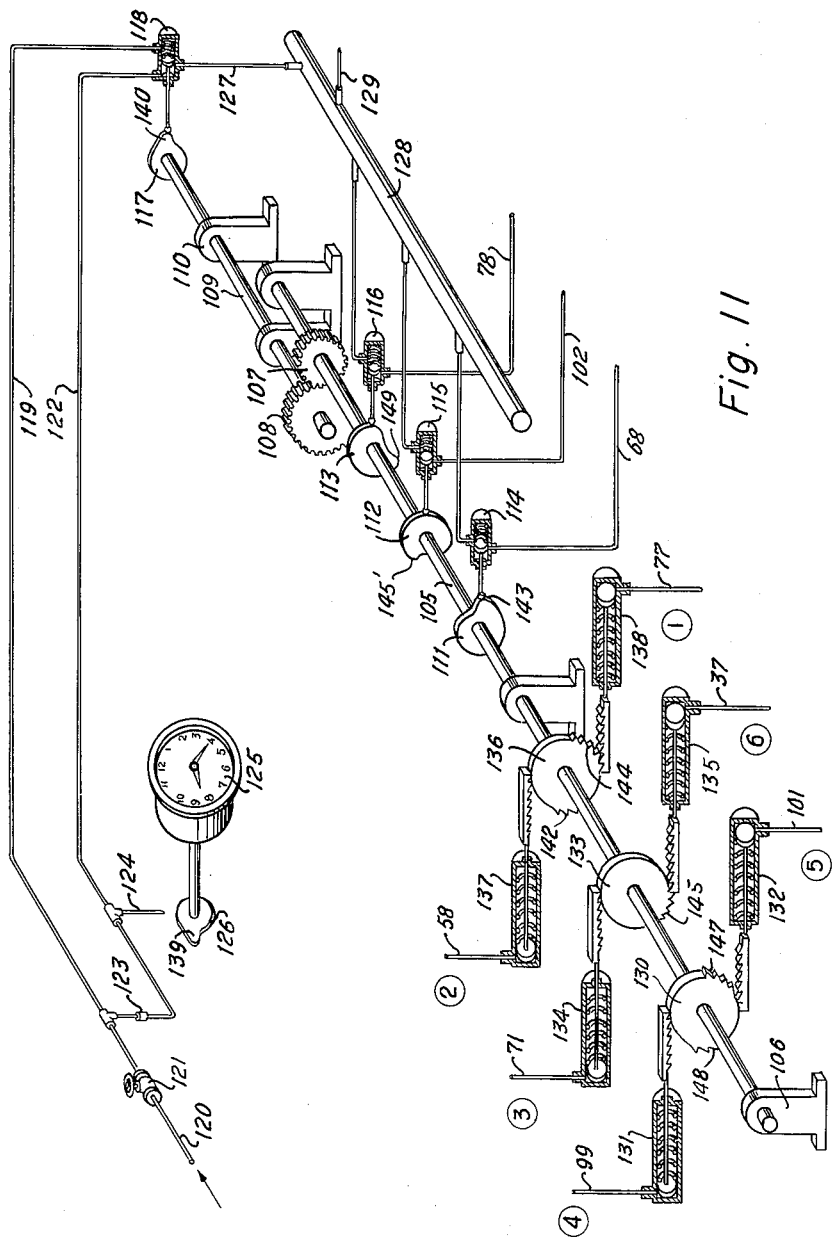
Figure 12:
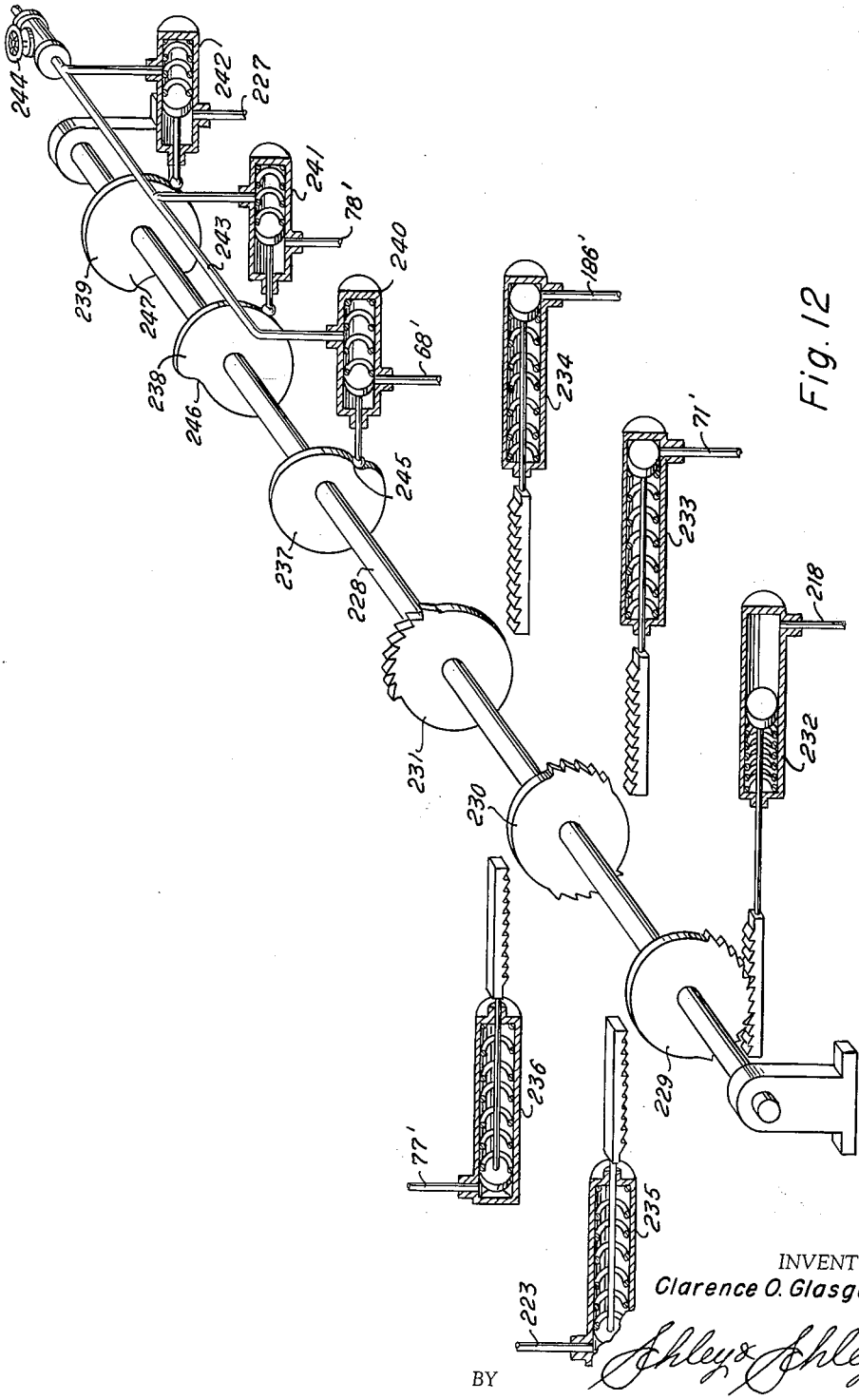

The invention will be more readily understood from a reading of the following specification and by reference to the accompanying drawings, wherein examples of the invention are shown, and wherein:

FIG. 1 is a schematic view, partly in elevation and partly in section, illustrating a metering structure constructed in accordance with this invention and adapted to carry out the methods hereof, FIG. 2 is an enlarged, fragmentary, sectional view of the sampling structure, FIG. 3 is a view similar to FIG. 1 illustrating a modification of the invention, FIGS. 4 and 5 are enlarged, fragmentary, sectional views illustrating modified forms of the upper and lower valve structures for the metering vessel, FIG. 6 is a schematic view of a clock-operated control unit for the system, FIG. 7 is a schematic view of a manually-actuated control unit for the system, FIG. 8 is a view similar to FIG. 1 illustrating a still further modification of the invention, FIG. 9 is a schematic view illustrating an additional modification of the system, FIG. 10 is a view similar to FIG. 1 illustrating yet another modification of the invention, FIG. 11 is a view in perspective of the control unit of FIG. 6, and FIG. 12 is a schematic view of a modified form of the control unit.

In general, the first form of the invention includes a metering vessel of known volume having a flow conductor to which are connected an inlet conductor and valve and an outlet conductor and valve. Both the inlet and outlet valves operate simultaneously with pilot valves which, in turn, trigger a control mechanism for proper sequential operation of the metering structure. There are provided liquid level responsive means in the upper and lower ends of the metering vessel for functioning at such times as the liquid level reaches the upper or lower end of the vessel to, in turn, actuate additional pilot valves which are also connected to the control mechanism to insure the proper initiation and completion of the metering cycle. A sampling mechanism is included, functioning at a selected time during the metering cycle and actuating pilot valves in the beginning and end of the sampling period, again for supplying impulses to the control unit and regulating the orderly progress of the metering cycle.

Again in general, the operation of this first modification involves the opening of the inlet valve and the filling of the metering chamber until the liquid level has reached the upper end thereof, at which time one of the pilot valves senses the filling of the vessel and through the control unit closes the inlet valve, and the latter causes the sampling structure to take a sample of the metering vessel contents and discharge the same to a suitable container. Upon completion of the sampling operation, the sampling structure actuates the control unit to open the discharge valve, and when the liquid level reaches the lower end of the metering vessel, another of the relay valves senses this condition and through the control unit closes the outlet valve while opening the inlet valve. A suitable recording mechanism makes a permanent record of the number of times the metering vessel is filled and emptied.

Turning now to the details of this first modification as shown in FIG. 1 of the drawings, the numeral 10 designates a metering chamber or vessel having a suitable volumetric capacity selected in accordance with the quantities of liquid which are to be passed therethrough and the liquid measuring capacity desired for the metering system. Thus, the vessel 10 may be of one barrel capacity, or five or ten barrel capacity, or may be adapted to handle fifty barrels or more of liquid during one filling and emptying cycle. An oil or liquid inlet conductor 11 is connected through a diaphragm-operated valve 12 with a T 13 leading through a conductor 14 and a float box 15 into the lower portion of the vessel 10, the remaining branch of the T 13 being connected to an oil or liquid outlet conductor 16 leading to a diaphragm-operated liquid discharge valve 17. The outlet conductor 18 of the valve 17 may be connected to a pipe line, to storage tanks, or to other suitable points of disposal of the oil or liquid. A gas discharge or equalizer pipe 19 leads from a float box 20 positioned in the upper end of the tank 10.

The float box 15 includes a collar or cylindrical housing 21 carrying a coupling 22 upon its lower end for connection to the pipe 14 and having its upper portion extending into and welded or otherwise suitably secured in the bottom portion of the vessel 10. The portion of the collar within the metering vessel 10 is provided with ports or slots 23 for communication with the interior of the vessel 10, and a float or float ball 24 is positioned within the collar and guided in its movement therein by a stem 25 extending upwardly through a guide bushing 26 in the upper end of the collar 21. A valve seat 27, adapted to be engaged by the float ball 24 is provided in the lower portion of the collar 21 adjacent the coupling 22 so that when the valve ball 24 moves downwardly with a descending liquid level and engages the seat 27, the upper and lower portions of the collar 21 are isolated from one another.

A diaphragm-operated pilot valve 28 is associated with the float box 15 and includes a diaphragm housing 29 divided by a spring-pressed diaphragm 30 into an upper chamber 31 and a lower chamber 32. The diaphragm 30 is adapted to reciprocate a stem 33 which carries a pilot valve piston 34 slidable within a pilot valve housing 35 depending from the diaphragm housing 29 and having a pilot gas inlet conductor 36 and a pilot gas outlet conductor 37. The spring 38 of the valve 28 normally urges the diaphragm 30 upwardly into the chamber 31 so as to elevate the piston 34 and isolate the conductors 36 and 37. In such position, the conductor 37 is exposed to the vent 39 in the lower portion of the valve housing 35.

The float box 15 is provided with a pressure fluid conductor 40 extending from a point above the seat 27 to the upper chamber 31 of the valve 28, and the conductor 14 is similarly provided with a pressure fluid conductor 41 leading from a position well below the seat 27 into the lower chamber 32 of the pilot valve 28. With this structure, so long as the liquid level within the vessel 10 is above the lower end thereof so as to elevate the float ball 24 into the position shown in FIG. 1, the conductors 40 and 41 are exposed to substantially the same pressure and the pilot valve 28 remains in the position shown in FIG. 1 in which the conductors 36 and 37 are not in communication, and in which the conductor 37 is vented to atmosphere through the vent opening 39.

The upper float box 20 is similarly arranged, there being provided a collar or cylindrical float housing 42 secured in the upper end of the vessel 10 and extending downwardly therein to communicate with the interior of the metering vessel 10 through ports or slots 43. A float ball 44 is contained within the float box housing 42 and carries a depending guide stem 45 slidable in a guide bushing 46. A valve seat 47 is provided in the upper end of the collar 42 immediately below a coupling 48 by which the collar 42 is connected to the gas pipe 19. A second diaphragm-operated pilot gas valve 49, substantially identical to the valve 28, is associated with the upper float box 20 and includes a diaphragm 50 dividing a diaphragm housing 51 into an upper chamber 52 and a lower chamber 53. The stem 54 of the diaphragm 50 is connected to a pilot valve piston 55 reciprocable in a pilot valve housing 56 to place a pilot gas inlet conductor 57 in or out of communication with a pilot gas outlet conductor 58. As shown in FIG. 1, the spring 59 of the valve 49 normally urges the diaphragm 50 downwardly into the space 53 to isolate the conductors 57 and 58 and vent the conductor 58 through an outlet port 60 provided in the pilot valve housing 56. A pressure fluid conductor 61 leads from the float box 20 below the valve seat 47 to the lower chamber 53 of the valve 49, and a second pressure gas conductor 62 leads from the gas outlet conductor 19 at a point spaced well above the seat 47 to the upper chamber 52 of the pilot valve 49. With this arrangement, the conductors 61 and 62 are in pressural communication so long as the float ball 44 is not elevated into engagement with the seat 47, and the pilot gas conductor 58 remains vented through the outlet port 60.

The liquid inlet valve 12 is adapted to be closed by a spring 63 and to be opened by the application of pilot gas under pressure upon a diaphragm 64 enclosed within a diaphragm housing 65 and having a depending valve stem 66 which carries the valve core 67 of the valve 12. A pilot gas supply conductor 68 communicates with the underside of the diaphragm 64 for moving the same upwardly against the spring 63 and thus lifting the valve core 67 from its seat.

The stem 66 also extends upwardly from the diaphragm 64 into a pilot valve 69 which may be of any suitable type and which is utilized for placing an inlet pilot gas conductor 70 into and out of communication with a pilot gas outlet conductor 71. The spring 63 normally holds the valve 12 closed and the pilot valve 69 in its open position to place the conductors 70 and 71 in communication. When, however, pilot gas under pressure is applied through the conductor 68 onto the underside of the diaphragm 64, the valve 12 is opened, the conductors 70 and 71 are isolated, and the conductor 71 along with the space above the diaphragm 64 within the diaphragm housing 65 is exposed to atmosphere through a vent opening 72.

The outlet valve 17 is constructed similarly to the inlet valve 12 and includes a diaphragm 73 enclosed in a housing 74 and functioning to open and close the valve 17 by raising and lowering of its valve core as well as to operate a pilot valve 75 for placing a pilot gas inlet conductor 76 into and out of communication with a pilot gas outlet conductor 77. A pilot gas supply conductor 78 is in communication with the underside of the diaphragm 73, and when pressure is applied thereto, the spring 79 of the valve 17 is compressed, the valve 17 is opened, and the conductors 76 and 77 are isolated from one another with the conductor 77 being exposed to atmosphere through the vent 80. When pressure is exhausted from beneath the diaphragm 73, the valve 17 is closed and the conductors 76 and 77 are placed in communication for supplying pilot gas under pressure to the conductor 77.

The metering structure also includes a sample-taking device which may be of any suitable or desirable type, but the preferred form of which, as shown in FIG. 1, includes an elongate, closed bottom tube 81 with an elongate cylindrical sleeve 82 having a sliding fit in its bore. The tube 81 is disposed within the vessel 10, preferably adjacent one side wall thereof, extending parallel to the vertical axis of the vessel 10 and having a sample discharge conductor 83 leading from its lower end through the sidewall of the vessel 10. The upper portion of the tube 81 extends exteriorly of the metering vessel and carries a diaphragm-actuated and switching structure 84 from which an actuating rod 85 extends axially downwardly into the tube 81 through an upper guide 86 and the closed upper end 87 of the sleeve 82. The rod 85 extends throughout the length of the sleeve 82 and projects slightly below the lower end thereof to support a slotted plug 88 having a sliding fit within the lowermost portion of the sleeve 82 and being reciprocable by the rod 85 between a lower position in which the slotted upper portion of the plug 88 is exposed to permit drainage from the interior of the sleeve 82 into the outlet pipe 83, and an upper position abutting an internal flange 89 formed slightly above the lower end of the sleeve 82 and on the interior thereof, in which latter position the slotted portion of the plug 88 is closed and drainage from the sleeve 82 is prevented. Further, the tube 81 is provided with a plurality of radial ports or openings 90 adapted to register with similar ports 91 formed in the wall of the sleeve 82, the ports 90 and 91 coming into registery when the sleeve 82 is elevated within the tube 81 by vertical movement of the rod 85.

The diaphragm unit 84 includes a diaphragm housing 92 having therein a diaphragm 93 to which the operating rod 85 is connected and from which the rod extends for connection with the valve core 94 of an upper pilot valve 95 carried upon the upper side of the diaphragm housing 92. There is also provided a lower pilot valve 96 between the upper end of the tube 81 and the diaphragm housing 92. The pilot valve 95, being operated by the rod 85, places a pilot gas supply conductor 98 in communication with a pilot gas outlet conductor 99 when the diaphragm 93 is elevated but otherwise vents the conductor 99. The pilot 96 is also actuated by the rod 85 and places an inlet gas conductor 100 in communication with a pilot gas outlet conductor 101 when the diaphragm 93 is in its lowered position, but venting the conductor 101 when the diaphragm 93 is elevated.

It is to be noted that when the diaphragm 93 is in its lower position, as shown in FIGS. 1 and 2, the ports 90 and 91 are out of communication and there is no flow of liquids into the interior of the tube 81. Further, the plug 88 is in its lower or draining position so as to drain the interior of the sleeve 82 through the outlet conductor 83. Now, when pilot gas under pressure is supplied to the underside of the diaphragm 93 through a pilot gas supply conductor 102, the diaphragm is elevated, switching the positions of the pilot valves 95 and 96, lifting the plug 88 into engagement with the flange 89 to cut off drainage from the sleeve 82, and sliding the sleeve 82 upwardly within the tube 81 to bring the ports 90 and 91 into registry so that liquid may flow into the interior of the sleeve from the metering vessel 10. Obviously, upon venting of the conductor 102 and downward movement of the diaphragm 93 by the spring in the housing 92, the vents 90 and 91 are moved out of registry and the sleeve 82 is drained through the outlet pipe 83.

The sampling structure and the various valves are operated through a sequence controlling unit 103 which may be of the clock-controlled, intermittently-operating type shown schematically in FIG. 6 and in perspective in FIG. 11, or may be of the continuously-operating type illustrated schematically in FIG. 7. Referring to FIGS. 6 and 11, the time-regulated sequence control unit includes a housing 104 in which is mounted an elongate cam shaft 105 upon suitable bearings 106. A gear wheel 107 is secured upon the shaft near one end thereof and meshes with a somewhat larger gear wheel 108 carried upon a second cam shaft 109 mounted on bearings 110. There are also mounted upon the shaft 105 a series of three cam wheels 111, 112, and 113 for actuating pilot valves 114, 115, and 116, respectively. The shaft 109 carries a cam wheel 117 for operating a three-way pilot valve 118 having a first pilot gas supply conductor 119 leading from a gas supply conductor 120 through a cut-off valve 121, and a second pilot gas supply conductor 122 leading as a branch conductor from the pipe 119 downstream of the valve 121 through a flow-restricting orifice 123 and a clock-controlled lateral vent 124. A clock unit 125 is adapted to rotate a cam wheel 126 which selectively opens and closes the vent 124 for pressurizing the conductor 122. The outlet conductor 127 of the valve 118 leads to a manifold 128 having an outlet conductor 129 for supplying gas to the various pilot valves illustrated in FIG. 1, and also for supplying gas to the pilot valves 114, 115, and 116. The latter have pilot gas outlet conductors previously numbered in the description of FIG. 1 as 68, 102, and 78, respectively.

For revolving the shafts 105 and 109 and operating the several pilot valves in proper sequence, there are provided a plurality of segmental ratchet wheels carried upon the shaft 105, the first ratchet wheel 130 being adapted to be operated by an opposed pair of pneumatically-operated, spring-returned ratchet actuators 131 and 132, the second ratchet wheel 133 similarly having a pair of ratchet drive units 134 and 135, and the third ratchet wheel 136 also having a pair of ratchet actuators 137 and 138. As indicated in FIG. 11, the conductor 99 is connected to the pressure inlet of the ratchet actuator 131, and the conductor 58 is connected to the actuator 137. Similarly, the conductor 101 is connected to the pressure inlet of the actuator 132, the conductor 37 is connected to the actuator 135, and the conductor 77 is connected to the actuator 138.

The time-controlled cam 126 may be arranged for revolution by the clock mechanism 125 at any desired rate, such as once every twenty-four hours, or once every twelve hours, or may carry any suitable number of lobes for closing of the exhaust vent 124 any desired number of times per revolution. As illustrated, the cam 126 is formed with a single lobe 139 for closing the vent 124 momentarily one time during each twenty-four hour period, but as noted above, this is only for purposes of illustration. The remaining cams and ratchet wheels have varying configurations which will be described in conjunction with the operation of the unit for purposes of greater clarity.

Assuming the metering unit to be idle and not to be metering petroleum or other fluids, gas pressure will be available through the supply inlet 120 and will be constantly escaping through the vent 124 but only at a very low rate due to the presence of the orifice restriction 123. The conductor 122 will be in communication with the conductor 127 through the valve 118, but by reason of the engagement of the lobe 140 of the cam wheel 117 with the operating stem of the pilot valve 118, the conductor 119 will be shut off from the conductor 127 and no gas flow will be taking place therethrough. Of course, there will be pilot gas under pressure in the conductor 119 but none in the conductor 122 since the vent 124 is uncovered.

Now, as the lobe 139 of the cam 126 moves into alignment with the vent 124 and closes the same, there will be an application of pressure through the conductor 122 to the conductor 127 and the manifold 128. This occurs because there is momentarily no point of escape for gas from the manifold 128, and in spite of the presence of the orifice 123, a pressure build-up in the manifold 128 will take place.

The pressurizing of the manifold makes pilot gas under pressure available through the outlet 129 to the inlets 36, 57, 70, 76, 98, and 100 of the several pilot valves shown in FIG. 1. This action also makes pilot gas under pressure available to pilot valves 114, 115 and 116 although no gas yet flows therethrough. Also, gas will not be flowing to the conductors 37, 58 and 99, but will be flowing to the conductors 71, 77, and 101.

The pressurizing of the conductor 77 will cause the ratchet actuator 138 to operate and through engagement with the segmental ratchet sector 144 of the ratchet wheel 136, revolve the shaft 105 through sixty degrees. The actuators 132 and 134 will also be operated by the pressurizing of the conductors 101 and 71, respectively, but since no ratchet teeth section is in position upon the ratchet wheel 133 for engagement by the actuator, there will be no effect upon the revolution of the shaft 105. The action of actuator 132 merely supplements the action of actuator 138.

The sixty degree revolution of the shaft 105 through oepration of the ratchet actuator 138 causes the gear wheel 107 to rotate the gear wheel 108 and the shaft 109 sufficiently to remove the lobe 140 of the cam 117 from engagement with the plunger of the three-way pilot valve 118 and accordingly shift the valve 118 to isolate the conductors 122 and 127 and to place the conductor 119 in communication with the conductor 127 thereby furnishing pilot gas under pressure to the manifold 128 regardless of the position of the time-actuated cam 126.

It is to be understood that this operation takes place very rapidly and that only momentary closing of the vent 124 by the lobe 139 of the cam 126 is necessary in order to initiate the metering cycle or cycles and create a main pilot gas supply through the conductor 119 to the manifold 128.

It will be noted that the plunger of the pilot valve 114 is in engagement with the circular periphery of the cam 111, and hence, that the manifold 128 is shut off from the pilot gas conductor 68 prior to the initial revolution of the shaft 105. It will also be noted from FIG. 11 that the periphery of the cam 111 is cut away at 143 in such manner that the initial sixty degree revolution of the cam 111 by the shaft 105 causes the pilot valve 114 to shift positions and place the manifold 128 in communication with the conductor 68. This function takes place, of course, simultaneously with the shifting of the pilot valve 118.

The supplying of pilot gas under pressure to the conductor 68 causes the diaphragm 64 of the valve 12 to lift, thereby opening the valve and initiating the flow of petroleum, or other liquid being metered, through the pipes 11 and 14 into the metering chamber 10, lifting the float ball 24 into the upper portion of the float box 15 and initiating the liquid metering cycle, as shown in FIG. 1. The lifting of the diaphragm 64 also shuts off the supply of pilot gas to the conductor 71 and vents the conductor to atmosphere through the port 72 whereby the pressure applied to the ratchet actuator 134 is relieved and the actuator is spring returned to the position shown in FIG. 11 in readiness for subsequent actuation. Also, it is to be noted that each of the ratchet wheels and each of the cams carried by the shaft 105 will have been rotated through sixty degrees and consequently shifted sixty degrees in a clockwise direction from the position shown in FIG. 11.

The filling of the metering vessel 10 now continues until the liquid level therein has moved to the top of the vessel and into the float box 20 to lift the float ball 44 into engagement with the seat 47. Thus, the metering vessel is filled under whatever back pressure is maintained upon the vent or equalizer pipe 19 which may be a pressure slightly above atmospheric, or any suitable or previously selected back pressure. Obviously, the filling of the metering chamber under a reduced pressure results in increased accuracy of measurement, and when practical, a minimum back pressure should be maintained upon the vent line 19.

Upon the closing of the vent 19 by engagement of the float ball 44 with the seat 47, however, a pressure build-up within the metering vessel 10 promptly occurs, the pressure increasing to that existent within the inlet conductor 11, and this pressure differential is communicated through the conductors 61 and 62 to the lower and upper sides, respectively, of the diaphragm 50 of the pilot valve 49 causing the valve to shift positions and place the pilot gas supply conductor 57 in communication with the conductor 58 and energizing the ratchet actuator 137 to rotate the shaft 105 through a further sixty degree travel. It is to be noted that the toothed segment 142 of the ratchet wheel 136 is initially displaced sixty degrees counter clockwise from a proper position for engagement by the actuator 137, that the initial sixty degree movement will move the toothed section 142 into operating position, and that operation of the actuator 137 will thus result in an additional sixty degree rotation of the several ratchet wheels and cams. This second revolution of the shaft 105 through an additional sixty degree arc again moves the circular periphery of the cam 111 into engagement with the actuating rod of the pilot valve 114 closing off the communication between the manifold 128 and the conductor 68 and venting the latter to atmosphere so as to remove the pressure of the pilot gas from beneath the diaphragm 64 of the valve 12 and permit the valve 12 to close and shut off the inflowing liquid or petroleum. The closing of valve 12 also shifts the pilot valve 69 to place the conductors 70 and 71 in communication and supply pilot gas under pressure to the ratchet actuator 134. The two previous sixty degree rotations of the shaft 105 will have brought the toothed segment 145 of the ratchet wheel 133 into operating position, and operation of the actuator 134 will result in a third sixty degree movement or revolution of the shaft 105. The third movement of the shaft 105 through one-sixth of a revolution has no effect upon the pilot valves 114 and 116 because their plungers remain in engagement with the circular periphery of the cams 111 and 113, respectively, but will move the cut-away portion 145' of the cam 112 into alinement with the operating rod of the pilot valve 115 placing the manifold 128 in communication with the conductor 102 and supplying pilot gas under pressure to the underside of the diaphragm 93 of the sampling structure to lift the diaphragm, close the lower end of the sleeve 82, and raise the sleeve within the tube 81 to bring the ports 90 and 91 into alinement so that a sample of the liquid contents of the vessel 10 flows into the interior of the sleeve 82. The lifting of the diaphragm 93 will also shift the pilot valve 96 to shut off communication between the conductors 100 and 101 and vent the conductor 101 whereby the pressure exerted upon the actuator 132 is relieved and the actuator allowed to return under spring pressure to a position for subsequent actuation, as shown in FIG. 11.

The upward movement of the diaphragm 93 also operates the pilot gas valve 95 to place the conductors 98 and 99 in communication, and a slow or restricted flow of pilot gas under pressure commences from conductor 98 through the orifice or other suitable time delay device 146 in conductor 99 to ratchet actuator 131 for a fourth revolution of the shaft 105 through a sixty degree arc. Obviously, the pilot valve 95 may be of the delayed operating type or any other suitable or desirable type of time delay means may be incorporated into the system for delaying the fourth increment of revolution of the shaft 105 a period of time sufficient to insure proper filling of the sampling sleeve 82. The three previous sixty degree rotations of the shaft 105 will, at this point, have brought the toothed section 147 of the ratchet wheel 130 into position for engagement by the actuator 131, and as the time-delayed built-up of pilot gas under pressure occurs within the actuator 131, the latter will be advanced to revolve the shaft 105 through a fourth arc of sixty degrees. This fourth sixty degree movement of the shaft 105 in revolving the cam 112 through another one-sixth of a revolution brings the circular periphery thereof again into engagement with the plunger of the pilot valve 115 to shut off communication between the manifold 128 and the conductor 102 and permit the diaphragm 93 to move downwardly, thus moving the sleeve 82 downwardly within the tube 81 and moving the plug 88 downwardly from its position within the lower end of the sleeve 82 whereby the sample of petroleum or liquid drains from the sleeve 82 through the sample outlet conductor 83. At the same time, the downward movement of the pilot valve 95 isolates the conductor 98 from the conductor 99, venting the latter and allowing the actuator 131 to retract into position for subsequent actuation. The downward movement of the diaphragm 93 will also again place the conductors 100 and 101 in communication thus operating the actuator 132. At this point, the toothed segment 148 of the ratchet wheel 130 will have been moved into position for engagement by the actuator 132, resulting in a further or fifth partial rotation of the shaft 105 through an arc of sixty degrees. With this fifth movement of the cam shaft, the cut-away portion 149 of the cam 113 will be brought into registry with the operating rod of the pilot valve 116 causing pilot gas under pressure to flow from the manifold 128 to the conductor 78 which places pressure beneath the diaphragm 73 of the valve 17 and opens the valve to commence the draining of the measured volume of liquid from the measuring chamber or vessel 10.

The opening of valve 17 shifts the pilot valve 75 to vent the conductor 77, and hence, the actuator 138 is vented and allowed to retract into position for subsequent operation.

The lowering of the liquid level in the vessel 10 as the latter drains will result in the lowering of the float 44 from engagement with the seat 47, thereby equalizing the pressure across the diaphragm 50 of the pilot valve 49 and permitting the same to shift to the position shown in FIG. 1 in which the conductor 58 is exhausted through the vent 60, thereby retracting the actuator 137 into position for subsequent operation. The measured volume of liquid continues to drain from the vessel 10, and when the level thereof reaches the float ball 24, the latter is lowered onto the seat 27 and thus creates a pressure differential between the conductors 40 and 41 to shift the diaphragm 30 of the pilot valve 28 downwardly and place the conductors 36 and 37 in communication. The pressurizing of conductor 37 operates the actuator 135, and since the toothed section 145 of the ratchet wheel 133, in the course of the five previous partial revolutions of the shaft 105, will have been moved through an arc of 300 degrees, the toothed section is in position for engagement by the actuator 135 to carry out a sixth revolution of the shaft 105 and complete the revolution thereof through a complete circle. This portion of the cycle revolves the cam 113 to bring the circular periphery thereof again into engagement with the operating plunger of the pilot valve 116, thereby isolating the manifold 128 from the conductor 78 and venting the latter conductor to cause the valve 17 to close.

When the valve 17 closes, the conductor 77 is again pressurized from the pilot gas supply conductor 76, again operating the actuator 138 to start a new metering cycle. The entire cam shaft having passed through one entire revolution, the various lobes and cut-away portions of the cams and toothed sections of the ratchet wheels will have returned to their original positions as shown in FIG. 11, and all will be in readiness for a repetition of the cycle. The operation of actuator 138 revolves the shaft 105 through the first sixty degrees of the second cycle of operation which again brings the cut-away portion 143 of the cam 111 into registry with the operating rod of the pilot valve 114 to pressurize the conductor 68 from the manifold 128 and supply gas under pressure beneath the diaphragm 64 of the inlet valve 12 to open the valve and initiate the flow of a second measured quantity of petroleum into the vessel 10. As soon as flow into the metering vessel commences, the float ball 24 will be elevated from engagement with the seat 27, thereby equalizing the pressure between the conductors 40 and 41 and allowing the pilot valve 28 to move upwardly and shut off communication between the conductor 36 and the conductor 37. Obviously, the venting of the conductor 37 through the vent 39 of the pilot valve 28 permits the actuator 135 to retract for subsequent operation. From this point on, the cycle continues to repeat itself, alternately filling and emptying the metering vessel 10 with the reception and discharge of accurately predetermined quantities of liquid. With each filling of the metering vessel, a representative sample of the contents thereof is taken and withdrawn through the outlet 83, such samples desirably being discharged into a single container for the provision of a representative average sample of the various batches of liquid passed through the metering chamber.

The gear wheel 108 may have any suitable or desirable number of teeth in proportion to the number of teeth of the gear wheel 107 so that the shaft 109 may be caused to undergo a complete rotation for any desired number of rotations of the shaft 105. Assuming that it is desired to measure and discharge six volumes of liquid from the vessel 10 during each period of operation, the gear wheel 108 may be provided with six times the number of teeth as the gear wheel 107 so that when the shaft 105 has undergone six complete revolutions and the shaft 109 has undergone one complete revolution, the lobe 140 of the cam 117 will again be brought into engagement with the plunger of the three-way pilot valve 118 to close off communication between the conductors 119 and 127 and thus close off the supply of operating pilot gas under pressure to the manifold 128. By this time, the lobe 139 of the clock-operated cam 126 will have moved from engagement with the vent 124, so that the conductor 122 is exposed to atmospheric pressure through the vent and consequently the manifold 128 and the entire system will be vented and exhausted to atmosphere causing the system to shut itself down. This will occur because simultaneously with the attempted operation of the actuator 138 with gas from the conductors 76 and 77, the supply of pilot gas under pressure from the manifold 128 will have been dissipated from the vent 124 and the shaft 105 will cease its revolution without going into the first sixty degree movement of the next subsequent cycle. When, however, a supply of pilot gas under pressure is again temporarily supplied to the manifold 128 through the conductor 122 by reengagement of the lobe 139 with the vent 124, a new cycle will be started and continued as described hereinabove. Obviously, as pointed out hereinbefore, the cam 126 may be regulated to revolve at any desired speed, and any desired number of the lobes 139 may be placed on the cam in order to initiate one or more cycles of operation of the metering unit at selected and predetermined intervals of time.

Any preferred type of counting device may be employed for keeping a record of the number of times the metering vessel 10 is filled and emptied, as for instance, the counting unit 150 connected to a diaphragm operator 151, which, in turn, is connected to the conductor 102 for actuation and the recording of one filling and emptying cycle each time the conductor 102 is pressurized to operate the sampling unit. Obviously, electrical or mechanical types of counters may be employed and may be connected at any desired point into the system where a pressurizing and venting or a physical movement or any other phenomena occurs once during each filling and emptying cycle.

The float balls 24 and 44, and the float boxes 15 and 20 are important not only for insuring proper sequencing of the metering cycle, but also, for insuring accuracy of measurement within the vessel 10. It is to be noted that the float boxes 15 and 20 are of quite small diameter as compared to the diameter of the vessel 10 and accordingly, at a given rate of inflow or outflow of liquid, the rate of change of liquid level within the float boxes 15 and 20 will be proportionately much greater, or will occur at a much more rapid rate, than within the vessel 10. Since the float balls 24 and 44 are free of encumbrance by actuating arms or levers and the like, they will very faithfully and accurately follow the rising and falling liquid levels, and since it is the downward movement of the float ball 24 into engagement with the seat 27 which terminates the draining operation and initiates the filling operation, and the upward movement of the ball 44 into engagement with the seat 47 which terminates the filling operation, very exact and precise opening and closing of the valves 12 and 17 is achieved, and highly accurate metering or measurement of the petroleum or other liquid realized. Due to the relatively small vertical distance between the valve 17 and the seat 27, the lower portion of the structure, including the conductors 11, 14, and 16, will remain full of liquid at all times, the accurate lowering of the float 24 into engagement with the seat 27 functioning almost instantaneously to close the valve 17 and thus provide a very sharp cut-off for the drainage portion of the cycle. Similarly, as the float ball 44 is moved upwardly into engagement with the seat 47, not only is there a very quick termination of the filling portion of the cycle, but in addition, because of the ball and seat effect achieved through utilization of the float ball 44 and seat 47, there will be no upward escape of liquid past the seat 47 to create possible inaccuracies of measurement.

The vent or equalizer conductor 19 may be connected to a separator or emulsion treater from which the metering vessel 10 is alternately being filled and emptied, or with any other suitable source of pressure, such as a back pressure valve (not shown) to provide a sufficient pressure differential between the conductors 40 and 41 to operate the pilot valve 28 when the vessel reaches the end of its draining period.

There are instances in which it is desirable to initiate one or more metering cycles manually, or at times or during periods not precisely determined in advance. For such types of metering operations, a modified form of the control unit 103 may be employed as illustrated in FIG. 7. This control unit is substantially identical to that illustrated in FIG. 6 and where applicable, the same numerals have been applied to the same parts or elements.

In essence, the modified control unit 152 of FIG. 7, simply omits the clock structure 125 and the pilot gas supply conductors 122, 119, and 127 of the form shown in FIG. 6, along with the three-way pilot valve 113, the gear wheels 107 and 108, the shaft 109, and the cam 117. Instead, a pilot gas supply conductor 153 is connected directly to the manifold 128 through a valve 154 so that upon opening of the valve 154, a metering cycle is commenced, the cycles continuing and repeating so long as the valve 154 remains open. If the system should be shut down in the middle of a cycle rather than at the end thereof, no harm or inaccuracy of measurement will result since all portions of the system will simply stop functioning, and when the valve 154 is again opened, the system will take up at the same point at which it shut down when the valve 154 was closed.

A modified form of the invention is illustrated in FIG. 3, this modification utilizing a somewhat simplified control system and omitting the sampling device but otherwise carrying out the metering operation with the same accuracy and in substantially the same manner as the first described form of the invention. The metering vessel 10 is utilized along with the lower float box 15 and upper float box 20, the inlet pipe 11 communicating through a diaphragm-operated inlet valve 155 with the T 13 and conductor 14 which is connected to the float box 15 by the coupling 22. The drain or outlet conductor 16 similarly leads from the T 13 through a diaphragm-operated outlet valve 156 communicating with the discharge conductor 18. The float box 15 encloses the float ball 24 which is adapted upon lowering of the liquid level to engage the seat 27, and the pressure fluid conductors 40 and 41 lead from the box 15 and conductor 14 above and below, respectively, the seat 27. Also in the same manner as the first described form of the invention, the upper valve box 20 encloses the valve ball 44 and is joined by the coupling 48 to the gas vent or equalizer pipe 19. The valve seat 47 is provided internally of the valve box so that when the float ball 44 is elevated into engagement with the valve seat, a pressure differential is created across the conductors 61 and 62.

The conductors 40 and 41 are connected across the diaphragm 157 of a diaphragm-operated pilot valve 158 of the type having a pilot gas inlet conductor 159, a pilot gas outlet conductor 160, and a vent 161. As clearly appears in FIG. 3, when a pressure differential is applied across the diaphragm 157 by seating of the float ball 24 upon the seat 27, the diaphragm 157 is moved downwardly to supply pilot gas under pressure to the conductor 160, the equalizing of the pressure across the diaphragm switching the valve 158 to vent the conductor 160 through the outlet 161. Similarly, the conductors 61 and 62 are connected across the diaphragm 162 of a diaphragm-operated pilot valve 163 having a pilot gas inlet conductor 164, a vent 165, and a pilot gas outlet conductor 166. Again, when a pressure differential is applied across the diaphragm 162 by engagement of the float ball 44 with the seat 47, the diaphragm 162 is shifted upwardly to close the vent 165 and pressurize the conductor 166. Subsequently, as the valve ball 44 drops from engagement with the seat 47, the diaphragm 162 moves downwardly to vent pilot gas from the conductor 166.

For actuation through the pressurizing of the conductors 160 and 166, there is provided a conventional switching valve 167 having an inlet conductor 168 for admission of pilot gas under pressure and a pair of outlet conductors 169 and 170 adapted to be placed in communication with the inlet conductor 168 in accordance with the longitudinal position of the valve stem 171 of the valve 167. The valve stem 171 is free of spring loading and is adapted to be shifted longitudinally within the valve 167 by a pair of diaphragms, one diaphragm 172 being provided at the left-hand end of the valve stem, as viewed in FIG. 3, for shifting the valve stem to the right, and the second diaphragm 173 being positioned at the right-hand end of the valve stem for shifting the same to the left. Obviously, when the valve stem 171 is shifted to the right, the conductor 170 is pressurized from the conductor 168, the conductor 169 being vented through the port 174, and when the valve stem is shifted to the left, the conductor 169 is pressurized while the conductor 170 is exhausted through the vent 175. Such valves are common and well known in this art and further description thereof is thought unnecessary.

The conductor 160 is exposed to the diaphragm 172 for shifting the stem 171 of the valve 167 to the right when the float ball 24 moves downwardly into engagement with the seat 27 so as to actuate the pilot valve 158, and thus, pilot gas under pressure is supplied to the conductor 170 in this position of the float ball 24. Because the valve 167 is free of springs, pilot gas under pressure will continue to be supplied to the conductor 170 even when the float ball 24 has moved upwardly from engagement with the seat 27, and shifting of the valve 167 to supply pilot gas under pressure to the conductor 169 will not occur until the float ball 44 has moved upwardly into engagement with the seat 47 to actuate the valve 163 and supply pilot gas under pressure through the conductor 166 to the diaphragm 173 of the switching valve 167. Again, following this latter operation, the switching valve will remain with its valve core 171 shifted to the left until such time as the float ball 24 moves downwardly into engagement with the seat 27 to actuate the pilot valve 158.

The inlet valve 155 is of a diaphragm-operated type in which the diaphragm 176 thereof has one side exposed to a conductor 177 for reception of pilot gas under pressure to close the valve, the opposite side of the diaphragm being exposed to a conductor 178 for reception of gas under pressure to open the valve. The conductor 177 is connected to the conductor 169, and the conductor 178 is connected to the conductor 170. The outlet valve 156 is of substantially the same structure as the valve 155, the upper side of the diaphragm 179 of the outlet valve being exposed through a conductor 180 to the conductor 170, the underside of the diaphragm 179 being exposed through a conductor 181 to the conductor 169. Thus, when pilot gas under pressure is supplied to the conductor 169, the valve 156 is opened and the inlet valve 155 is closed. When pilot gas under pressure is supplied through the conductor 170, the outlet valve 156 is closed and the inlet valve 155 simultaneously opened.

In the operation of this form of the invention, assuming the core 171 of the switching valve 167 to be shifted to the right as shown in FIG. 3, gas under pressure will be flowing from the inlet conductor 168 to the conductor 170 and thence to the conductors 178 and 180 to hold the outlet valve 156 closed and the inlet valve 155 open. Thus, petroleum or other liquids will be flowing from the inlet conductor 11, through the conductor 14 into the vessel 10, and although the valve ball 24 will have been lifted from its seat 27 and the pilot valve 158 accordingly closed, there will be no shifting of the switching valve 167 since the valve core thereof is not spring loaded. When the liquid level in the vessel 10 reaches the float ball 44 and elevates the same into engagement with the seat 47, the pilot valve 163 will be actuated to pressurize the conductor 166, shifting the core of the switching valve 167 to the left to vent the conductor 170 and pressurize the conductor 169. When this takes place, the valve 155 will close and the valve 156 will open almost instantaneously so that a measured quantity of liquid may begin draining from the vessel 10 to the outlet 18. When the liquid level reaches the lower float ball 24 and moves the same downwardly into engagement with the seat 27, the switching valve 158 will be actuated to again shift the switching valve 167, venting the conductor 169 and pressurizing the conductor 170 to close the outlet valve 156 and open the inlet valve 155. Of course, the utilization of the float balls and float boxes in this modification of the invention provides the same operational advantages and accuracy of measurement as pointed out in connection with the first form of the invention. For recording the number of metering cycles or the number of times the vessel 10 is filled and emptied, there may be provided a suitable counter structure 182, which may be the same as the counter structure 150 and 151 previously described, and which may be connected at any suitable or desirable point into the system, such as into the conductor 170 as shown in FIG. 3 of the drawings.

The modification of FIG. 3 may be further modified as shown in FIGS. 4 and 5 in which the valve 158 is replaced with a lower lever-operated pilot valve 183 having a vent 184, a pressure fluid inlet 185, and a pressure fluid outlet 186, the valve being adapted to be shifted between pressurizing and venting positions by means of an elongate lever or finger 187 extending into the valve cage 15 beneath the seat 27 for engagement by the valve ball 24 when the latter moves into its lowermost position in engagement with the seat 27. In like manner, the upper pilot valve 163 may be replaced by an upper lever-operated pilot valve 188 having a vent 189, a pressure fluid inlet conductor 190, and a pressure fluid outlet conductor 191. The elongate operating lever or finger 192 of the valve 188 extends into the upper float box 20 above the seat 47 thereof for engagement by the float ball 44 when the latter moves upwardly into engagement with the seat. With this arrangement, the valves 183 and 188 are made responsive to the physical movement of the float balls 24 and 44 rather than pressure differentials created across the float boxes 15 and 20, and thus, the inlet pressure to the system, the pressure maintained in the vent 19, or the pressure existent within the vessel 10 at any time becomes non-critical as to operation of the pilot valves 183 and 188, and any suitable or desirable pressure may be maintained at any of these points. At the same time, however, the benefits obtained by engagement of the float balls with their respective seats are maintained in so far as substantially instantaneous and very accurate shutting off of the flow into and out of the vessel 10 is concerned, the float balls continuing to engage their respective seats and terminating the liquid flow at very precise levels while at the same time mechanically operating the pilot valves for operation of the switching valve 167 and opening and closing of the inlet and outlet valves 155 and 156 without depending upon the presence or absence of any pressural differences in the system.

In FIG. 8 of the drawings, there is shown a further modification of the invention which is quite similar to the modification shown in FIG. 3 in that it utilizes the measuring vessel 10, the float boxes 15 and 20, the pilot valves 163 and 158, and the switching valve 167. The two inlet and outlet valves 155 and 156 are replaced with a single three-way valve 193 having an inlet conductor 194, an outlet conductor 195 and a filling and discharge conductor 196 leading to the lower end of the vessel 10 through the float box 15. The two float balls 24 and 44 are replaced by a single float ball 97 confined within a slotted or perforated tube 198 extending axially of the vessel 10 between the float boxes 15 and 20, the float ball 197 traveling upwardly and downwardly within the vessel 10 in accordance with the liquid level therein to initiate the filling and emptying sequences of the metering cycle in substantially the same manner as the float balls 24 and 44. The float box 15 is provided with the seat 27 adapted to be engaged by the float ball 197 and from either side of which the pressure conductors 40 and 41 lead to the pilot valve 158. The float box 20 also carries the seat 47 adapted to be engaged by the float ball 197 at the uppermost point of its travel, and the pressure conductors 61 and 62 lead from the lower and upper sides of the seat 47 to the pilot valve 163 for actuating the same when the float ball engages the upper seat.

The operation of this form of the invention is substantially the same as that of the modification of FIG. 3, the outlet conductors 169 and 170 of the switching valve 167 being exposed respectively to the lower and upper sides of the diaphragm 199 of the three-way valve 193 for switching the conductor 196 into communication with the outlet 195 when the float 197 engages the upper seat 47, and switching the valve 193 to place the conductors 194 and 196 in communication when the valve ball reaches its lower point of travel and engages the seat 27. As in the previously described forms of the invention, the suitable counter mechanism 182 is connected into the system at any desired or suitable point such as into the conductor 170.

The further modification of the invention illustrated in FIG. 9 utilizes substantially the same valving system as the form of the invention shown in FIG. 3 and employs the inlet valve 155, the outlet valve 156, the pilot valves 158 and 163 and the switching valve 167. In place of the two float arrangement of FIG. 3, the latter modification employs the single float arrangement of FIG. 8, and the same numerals have been applied throughout FIG. 9.

In addition to the objectives sought to be accomplished in the previously described forms of the invention, this latter modification also has the objective of retarding or slowing the draining of the metering vessel 10 when the liquid level in the vessel nears the lower end thereof during the draining step. For accomplishing this result, a float operated pilot valve 200 is mounted upon the lower portion of the vessel 10 and provided with a float 201 carried upon its actuating arm 202 and extending into the lower portion of the vessel 10 adjacent the bottom thereof. The pilot valve 200 has a pressure fluid inlet 203, a vent 204 and a pressure fluid outlet 205 leading to the diaphragm housing 206 of a diaphragm-operated valve 207 disposed in the outlet conductor 16 between the T 13 and the outlet valve 156. A bypass conductor 208 is shunted across the valve 207 through a manually adjustable flow-restricting valve 209 so that when the valve 207 is closed drainage of liquids from the metering vessel 10 can take place only through the restricting valve 209.

The operation of this modification of the invention is the same as that of the previously described forms with the exception that when the liquid level nears the lower end of the vessel 10 in the draining or discharging step and lowers the float 201 to pressurize the conductor 205, the valve 207 is closed, shutting off the normal discharge route through the conductor 16 and causing the liquid to be passed only through the restricting valve 209. Thus, the rate of discharge may be reduced to any desired level, depending upon the manual setting or adjustment of the valve 209, and the float ball 197 is thus caused to approach the lower seat 27 at a rate which may be retarded to any desired extent, thereby providing for even greater accuracy of operation of the outlet valve 156 and termination of the draining step by engagement of the valve ball 197 with the seat 27. If, for any reason, the liquid level in the vessel 10 was falling at a quite considerable rate due to rapid drainage of liquid therefrom, thereby causing the float ball 197 to approach and engage the seat 27 under considerable velocity, some inaccuracies of measurment might occur due either to the vortex effect obtained by rapid liquid drainage through the lower float box 20, or by reason of other physical phenomena, and this automatic retarding or slowing of the draining of the liquid from the vessel in the terminal portion of the draining step will eliminate these possibilities to insure proper engagement of the float ball with the lower seat and exact operation of the pilot valve 158 to close the valve 156 and open the valve 155. Again, the counting mechanism 182 may be connected into the system at any desired point as for instance, into the conductor 178.

A still further modification of the invention is illustrated in FIG. 10 which includes the metering vessel 10' along with the lower float ball 24' and float cage structure 15', the same as the corresponding elements as illustrated in FIG. 5. The float cage 15' encloses the valve seat 27', and the pilot valve 183' has its actuating arm 187' extending into the float cage beneath the float ball seat. The inlet and outlet valve structure is substantially the same as that of FIG. 1, the inlet pipe 11' opening through the inlet valve 12' to the T 13' from which the filling and emptying pipe 14' extends upwardly to the cage 15', the other branch of the T 13' receiving the outlet pipe 16' which communicates with the discharge conductor 18' through the outlet valve 17'. The inlet and outlet valves include the pilot valves 69' and 75' similarly to the modification of FIG. 1, and the various other parts and conductors associated with the valves have been similarly numbered with the numbers being primed throughout FIG. 10 where they designate previously described parts of substantially the same descriptive nature.

A dome 210 is secured upon the upper end of the vessel 10', and a relatively small diameter pipe 211 extends upwardly from the interior of the vessel 10' into the dome, a semi-partition 212 extending transversely of the dome shortly below the open upper end of the pipe 211. A gas vent or equalizer pipe 213 is provided in the uppermost portion of the dome 210.

A float 214 is provided within the interior of the dome below the partition 212 and operates a pilot valve 215 having a pilot gas inlet conductor 216 and a vent 217, along with a pilot gas outlet conductor 218. A drain pipe 219 leads from the lower portion of the dome 210 through a diaphragm-operated valve 220 into the upper portion of the metering vessel 10'.

A diaphragm-operated, spring-return pilot valve 220 is also utilized, the valve having a pressure fluid inlet 221, a vent 222 and a pressure fluid outlet conductor 223. A branch conductor 224 leads from the conductor 218 into the diaphragm housing 225 of the pilot valve 220, application of pressure through the conductor 212 shifting the pilot valve 220 to vent the conductor 223, the removal of pressure from the diaphragm housing of the pilot valve 220 allowing the same to be spring-returned to its normal position wherein pressure fluid is supplied from the conductor 221 to the conductor 223. The pressure fluid conductor 71' from the pilot valve 69', the pressure fluid conductor 186' from the pilot valve 183', the pressure conductor 77' from the pilot valve 75', the pressure conductor 218 from the pilot valve 215, and the pressure conductor 223 from the pilot valve 220, all lead into a control unit 226, and the pressure fluid outlet conductors 68' and 78' lead from the control unit 226 to the diaphragm housings of the valves 12 and 17', respectively. A third pressure fluid outlet 227 leads from the control unit to the diaphragm housing of the valve 220 for opening the same upon the application of pressure.

The control unit 226 is quite similar to that previously described and which is shown in FIGS. 6 and 11, but is adapted to be carried through a complete cycle in five increments rather than six. The control unit 226 includes an elongate cam shaft 228 having thereon three ratchet wheels 229, 230, and 231, similar to the ratchet wheels 130, 133, and 136 of the control unit shown in FIG. 6. There is also provided ratchet actuators 232, 233, and 234 for the cam wheels 229, 230, and 231, respectively, and second actuators 235 and 236 for the ratchet wheels 229 and 230.

The shaft 228 also carries three cam wheels, 237, 238, and 239, the cam 237 being adapted to actuate a pilot valve 240, while the cam 238 actuates a pilot valve 241 and the cam 239 actuates a pilot valve 242. A gas supply manifold 243 is connected to the inlets of the three pilot valves 240, 241, and 242, and a suitable valve 244 controls the admission of pilot gas under pressure to the manifold.

The operation of this form of the invention is very similar to that of the modification illustrated in FIG. 1, but no provision is made for the sampling of each batch of liquid metered through the vessel 10'. Of course, provision for such sampling may readily be made, the control unit 226 being appropriately modified to operate the sampling unit of the first form of the invention at a proper point in the metering cycle.

Assuming the vessel 10' to be filling from the inlet conductor 11' as shown in FIG. 10, the valve 12' will be open and the float 24' will be elevated from its seat 27'. The valves 17' and 220 will be closed. Now, as the liquid reaches the upper end of the vessel 10', the entry of the liquid into the restricted riser pipe 211 results in a snubbing action which slows the rate of liquid flow into the vessel, providing for more accurate measurement and affording ample time for operation of the various control elements. The liquid will overflow the top of the pipe 211 and pass into the lower portion of the dome 210, rising therein until it has elevated the float 214 to actuate the pilot valve 215, thus supplying pilot gas under pressure through the conductor 212 to close the pilot valve 220 and simultaneously operating the actuator 232. It is to be noted that the open upper end of the pipe 211 is at a fixed elevation whereby the liquid reaches an upper level in the tank 10' at exactly the same point for each metering cycle. The excess liquid overflows and is ultimately disposed of through the valve 220, but during the period the measured quantity of liquid is draining from the vessel 10', only that liquid will be discharged which is present within the vessel 10', which is completely filled, and in the pipe 211 to the upper end thereof. Thus, a very precise and accurate upper liquid level or upper liquid level limit is maintained at all times. The supplying of pilot gas under pressure to the conductor 218 by opening of the pilot 215, operates the actuator 232 (shown in FIG. 12 in the process of such actuation) to rotate the shaft 228 through one-fifth of a revolution or approximately 72 degrees, which rotates the cam 237 into a position wherein the plunger of the pilot valve 240 is removed from the cut-away portion 245 of the cam 237, closing the valve 240 and shutting off the supply of pilot gas under pressure from the manifold 243 to the conductor 68' whereby the inlet valve 12' is spring-closed.

The closing of valve 12' will result in a simultaneous opening of the pilot valve 69', thus supplying pilot gas under pressure from the conductor 70' to the conductor 71' and operating the actuator 233 to advance the shaft 228 another 72 degrees and bring the cut-away portion 246 of the cam 238 into alinement with the plunger of the pilot valve 241 to supply gas under pressure to the conductor 78' and open the outlet valve 17'. The opening of the outlet valve 17' initiates the draining of the measured quantity of liquid from the vessel 10 and also closes the pilot valve 75' to de-pressurize the conductor 77' and allow the actuator 236 to retract.

The measured quantity of liquid drains from the vessel 10' until the level thereof has reached the float 24' and moved the float ball into engagement with the seat 27' and also into engagement with the finger 187' of the pilot valve 183'. Thus, a very accurate lower level is established and maintained, and at the same time, the pilot valve 183' is actuated to pressurize the conductor 186' and operate the actuator 234 for advancing the shaft 228 through a third movement of 72 degrees. This movement closes the pilot valve 240, shutting off the supply of pilot gas to the conductor 78' and allowing the outlet valve 17' to spring-close while the pilot valve 75' is opened. The opening of the pilot valve 75' supplies gas under pressure through the conductor 77' to the actuator 236 to rotate the shaft 228 through a fourth movement of 72 degrees, bringing the cut-away portion 247 of the cam 239 into engagement with the plunger of the pilot valve 242 to pressurize the conductor 227 and open the drain valve 220. When this occurs, that liquid which has flowed into the dome 210 will be drained into the vessel 10' through the conductor 219 for subsequent measurement with the next succeeding batch of liquid to be metered, thus recovering this small quantity of liquid and preventing its loss, but at the same time, preventing its interference with the accurate measuring of bodies of liquid within the metering vessel.

As the liquid drains from the dome 211, the float 214 will be lowered to close the pilot valve 215, thus retracting the actuator 232 and relieving gas pressure from the diaphragm housing 225 of the pilot valve 220 to open the valve and pressurize the conductor 223 for operating the actuator 235 to move the shaft 228 through its fifth increment of revolution of 72 degrees. This revolution moves the cut-away portion 247 of the cam 239 from engagement with the plunger of the pilot valve 252, de-pressurizing the conductor 227 to close the valve 220 and again opening the pilot valve 238 to pressurize the conductor 68' and open the inlet valve 12'. The opening of the inlet valve 12' closes the pilot valve 69' to de-pressurize the conductor 71' and retract the actuator 233. The structure is thus carried through a complete cycle employing a float ball and seat arrangement at the lower end of the metering vessel for obtaining very exact and accurate lower liquid levels, and using a reverse weir or overflow principle at the upper end of the vessel for equally exact or even more exact maintenance of upper liquid levels. Of course, the suitable counter unit 182 is connected into the system at any suitable point such as into the conductor 68' for recording the number of times the vessel 10 has been filled and emptied so as to provide exact information as to the total volume of liquid which has been metered.

It is quite apparent that the system may be operated electrically as well as hydraulically, that in certain instances such as in the utilization of the float 201 of the modification shown in FIG. 9 or the float 214 of the modification shown in FIG. 10, electronic liquid level probes or other level responsive means may be employed in place of the floats for detecting the presence or absence of a liquid level and accordingly operate electrical valves, or valves which in turn operate pneumatic valves. The system is not to be limited to electric, hydraulic, or mechanical operation since all are equally well known in this field and may readily be substituted one for the other. At the same time, however, the utilization of the float ball or float balls within the metering vessel and their engagement with seats while creating pressure differentials or while contacting actuating arms for operation of pilot valves, is very important to the accuracy of operation of the system, and it is also preferable and in many instances important to utilize the pneumatically actuated type of control unit as shown in FIGS. 6, 7, 11 and 12, wherein pilot valves are utilized for opening or closing flow valves, the opening or closing of the flow valves simultaneously actuating additional pilot valves to provide further pneumatic impulses for continued operation and proper sequencing of the metering cycle.

The structure including the float balls guided within the float cages or housings is important also in that the flow into and out of the metering vessel through either the gas equalizer pipe or the inlet and outlet pipe for liquids, occurs through a single conductor and through the seats upon which the float balls engage. Thus, not only do the float balls insure high accuracy of metering or measurement, but also, when reverse flow through the conductors occurs upon the next step in the metering cycle, the flow of fluid through the float cages or housings and against the seated float balls insures the proper unseating of the balls and overcomes any tendency which may exist for the float balls to stick or fail to disengage from their seats.

In conjunction with the modification of the invention illustrated in FIG. 1, it is to be pointed out that the sampling device may be operated at any suitable or desirable time in the metering cycle, it having been described as being operated after the inlet valve is closed and before the outlet valve is opened, but it being equally advantageous to operate the sampling structure while the inlet valve is still open. This will not only provide a constant inlet pressure for forcing the sample into the sampling tube, but will also insure the complete filling of the metering vessel 10 regardless of the size of the sample which is withdrawn. Of course, with appropriate modification which will be apparent to those skilled in the art, the sampling structure may be incorporated in any of the modifications of the invention for withdrawing samples at a proper time in the metering cycle.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. Metering means for measuring liquids including, a metering vessel of predetermined volume, means for admitting a liquid to said vessel and discharging the liquid therefrom, means for establishing a maximum upper liquid level in the vessel, means for establishing a minimum lower liquid level in the vessel, the means for establishing a minimum lower liquid level in the vessel including valve float and valve seat means, means for detecting the seating of the float on the seat, and means responsive to the detecting of the seating of the float on the seat for closing said discharging means.

2. Metering means for measuring liquids including, a metering vessel of predetermined volume, means for admitting a liquid to said vessel and discharging the liquid therefrom, means for establishing a maximum upper liquid level in the vessel, means for establishing a minimum lower liquid level in the vessel, the means for establishing a minimum lower liquid level in the vessel including a valve seat through which fluid flows from the vessel and liquid level responsive means for engaging the seat, means for detecting the engaging of the liquid level responsive means on the seat, and means responsive to the detecting of the engaging of the liquid level responsive means on the seat for closing said discharging means.

3. Metering means for measuring liquids including, a metering vessel of predetermined volume, a single conductor for admitting a liquid to said vessel and discharging the liquid therefrom, means for establishing a maximum upper liquid level in the vessel, means for establishing a minimum lower liquid level in the vessel, the means for establishing a minimum lower liquid level in the vessel including a valve seat in the conductor and liquid level responsive means for engaging the seat, means for detecting the engaging of the liquid level responsive means on the seat, and means responsive to the detecting of the engaging of the liquid level responsive means on the seat for closing said discharging means.

4. Metering means as set forth in claim 1, and means for taking a sample of the metering vessel contents when the vessel is full.

5. Metering means for measuring liquids including, a metering vessel of predetermined volume, means for admitting a liquid to said vessel and discharging the liquid therefrom, means in the vessel responsive to maximum and minimum levels therein, an upper valve seat in the upper end of the vessel, a lower valve seat in the lower end of the vessel, means for guiding the liquid level responsive means into engagement with the upper seat to establish a maximum liquid level when the vessel is filled and into engagement with the lower seat to establish a minimum liquid level when the vessel is emptied, outlet valve means for controlling the discharge of liquid from the vessel, and means for detecting the engaging of the liquid level responsive means with the lower valve seat for closing the outlet valve means.

6. Metering means as set forth in claim 5 wherein the liquid level responsive means is a pair of float balls.

7. Metering means as set forth in claim 5 wherein the liquid level responsive means is a single float ball.

8. Metering means as set forth in claim 5 including, inlet valve means for controlling admission of liquid to the metering vessel, and means responsive to the engagement of the liquid level responsive means with the upper seat for closing the inlet valve means.

9. Metering means for measuring liquids including, a metering vessel of predetermined volume, means for admitting a liquid to said vessel and discharging the liquid therefrom, means in the vessel responsive to maximum and minimum levels therein, an upper valve seat in the upper end of the vessel, a lower valve seat in the lower end of the vessel, means for guiding the liquid level responsive means into engagement with the upper seat to establish a maximum liquid level when the vessel is filled and into engagement with the lower seat to establish a minimum liquid level when the vessel is emptied, inlet valve means for controlling admission of liquid to the metering vessel, means responsive to the engagement of the liquid level responsive means with the upper seat for closing the inlet valve means, outlet valve means for controlling the discharge of liquid from the vessel, and means responsive to the engaging of the liquid level means with the lower seat for closing the outlet valve means, the means responsive to engaging of the level responsive means with the upper and lower seats being pilot valve means responsive to pressure differentials created when the seats are engaged.

10. Metering means for measuring liquids including, a metering vessel of predetermined volume, means for admitting a liquid to said vessel and discharging the liquid therefrom, means in the vessel responsive to maximum and minimum levels therein, an upper valve seat in the upper end of the vessel, a lower valve seat in the lower end of the vessel, means for guiding the liquid level responsive means into engagement with the upper seat to establish a maximum liquid level when the vessel is filled and into engagement with the lower seat to establish a minimum liquid level when the vessel is emptied, inlet valve means for controlling admission of liquid to the metering vessel, means responsive to the engagement of the liquid level responsive means with the upper seat for closing the inlet valve means, outlet valve means for controlling the discharge of liquid from the vessel, and means responsive to the engaging of the liquid level means with the lower seat for closing the outlet valve means, the means responsive to engaging of the level responsive means with the upper and lower seats being pilot valve means actuated by arms engaged by the level responsive means when the seats are engaged.

11. Metering means as set forth in claim 3 wherein the single conductor opens into the metering vessel through an enclosure of small cross-section as compared to the vessel, and the seat is disposed in said enclosure.

12. Metering means as set forth in claim 1 including, shut-off valve means in the means for discharging liquid from the metering vessel, liquid level responsive means in the lower portion of the vessel for closing the shut-off valve means, and a flow-restricting by-pass conductor connected across the shut-off valve means.

13. Metering means as set forth in claim 1 including, shut-off valve means in the means for discharging liquid from the metering vessel, liquid level responsive means in the lower portion of the vessel for closing the shut-off valve means, a by-pass conductor connected across the shut-off valve means, and adjustable flow-restricting means in the by-pass conductor.

14. Metering means as set forth in claim 1, wherein the means for establishing a maximum upper liquid level in the vessel includes, an overflow enclosure, and an overflow conductor extending upwardly from the vessel into the overflow enclosure and discharging into the enclosure at a fixed elevation so as to provide a fixed maximum level in the vessel.

15. Metering means as set forth in claim 1, wherein the means for establishing a maximum upper liquid level in the vessel includes, an overflow enclosure, and an overflow conductor extending upwardly from the vessel into the overflow enclosure and discharging into the enclosure at a fixed elevation so as to provide a fixed maximum level in the vessel, and valve means for returning overflowed liquid from the enclosure to the vessel.

16. Metering means for measuring liquids including, a metering vessel of predetermined volume, a single conductor for admitting a liquid to said vessel and discharging the liquid therefrom, the single conductor communicating with the vessel through a lower enclosure of small cross-section as compared to the vessel and depending from the lower end of the vessel, a lower valve seat in the lower enclosure, an upper enclosure of small cross-section as compared to the vessel and extending upwardly from the upper end of the vessel, an upper valve seat in the upper enclosure, a gas conductor communicating with the upper enclosure, liquid level responsive means for engaging the lower seat to establish a minimum liquid level when the vessel is emptied and for engaging the upper seat to establish a maximum liquid level when the vessel is filled, outlet valve means for controlling the discharge of liquid from the vessel, and means for detecting the engaging of the level responsive means with the lower valve seat for closing the outlet valve means.

17. Metering means as set forth in claim 16, wherein the upper and lower enclosures are connected by a perforated tube, and the liquid level responsive means is a single float ball confined in said tube.

18. Metering means for measuring liquids including, a metering vessel of predetermined volume, inlet valve means to the vessel, a pilot valve cooperating with and actuated simultaneously with the inlet valve means, outlet valve means from the vessel, a pilot valve cooperating with and actuated simultaneously with the outlet valve means, a pilot valve actuated when liquid reaches a maximum level in the vessel, a pilot valve actuated when liquid reaches a minimum level in the vessel, a metering cycle controller having actuating means responsive to pressure fluid impulses from each of the pilot valves for sequencing the controller through a metering cycle, pilot valve means in the controller actuated by the sequencing thereof for opening the inlet valve means only when the outlet valve means is closed and opening the outlet valve means only when the inlet valve means is closed, pressure fluid conductors leading from the pilot valve means in the controller for actuating the inlet and outlet valve means, pressure fluid supply means for the pilot valves, pressure fluid conductors leading from the pilot valves to the controller actuating means for supplying actuating impulses to the controller as the valve means and pilot valves are actuated.

19. Metering means for measuring liquids including, a metering vessel of predetermined volume, inlet valve means to the vessel, a pilot valve cooperating with and actuated simultaneously with the inlet valve means, outlet valve means from the vessel, a pilot valve cooperating with and actuated simultaneously with the outlet valve means, a pilot valve actuated when liquid reaches a maximum level in the vessel, a pilot valve actuated when liquid reaches a minimum level in the vessel, means for sampling the liquid in the vessel, actuating means for the sampling means, pilot valves coacting with the sampler actuating means, a metering cycle controller having actuating means responsive to pressure fluid impulses from each of the pilot valves for sequencing the controller through a metering cycle, pilot valve means in the controller actuated by the sequencing thereof for opening the inlet valve means only when the outlet valve means is closed and opening the outlet valve means only when the inlet valve means is closed, pressure fluid conductors leading from the pilot valve means in the controller for actuating the inlet and outlet valve means, pressure fluid supply means for the pilot valves, pressure fluid conductors leading from the pilot valves to the controller actuating means for supplying actuating impulses to the controller as the valve means and pilot valves are actuated.

20. Metering means for measuring liquids including, a metering vessel containing a predetermined volume of liquid between maximum and minimum liquid levels, an inlet valve to the vessel having an operating stem, impulse control means actuated with the inlet valve operating stem, an outlet valve from the vessel having an operating stem, impulse control means actuated with the outlet valve operating stem, impulse control means actuated when liquid reaches a maximum level in the vessel, impulse control means actuated when liquid reaches a minimum level in the vessel, a metering cycle controller having actuating means responsive to impulses from each of the impulse control means for sequencing the controller through a metering cycle, a pilot impulse means in the controller actuated by the sequencing thereof for opening the inlet valve means only when the outlet valve means is closed and opening the outlet valve means only when the inlet valve means is closed, impulse conductors leading from the pilot impulse means in the controller to the inlet and outlet valves, impulse supply means for the impulse control means, and impulse conductors leading from the impulse control means to the controller actuating means for supplying actuating impulses to the controller as the valves and impulse control means are actuated.

21. Metering means for measuring liquids including, a metering vessel containing a predetermined volume of liquid between maximum and minimum liquid levels, an inlet valve to the vessel having an operating stem, impulse control means actuated with the inlet valve operating stem, an outlet valve from the vessel having an operating stem, impulse control means actuated with the outlet valve operating stem, impulse control means actuated when liquid reaches a maximum level in the vessel, impulse control means actuated when liquid reaches a minimum level in the vessel, means for sampling the liquid in the vessel, actuating means for the sampling means, impulse control means coacting with the sampler actuating means, a metering cycle controller having actuating means responsive to impulses from each of the impulse control means for sequencing the controller through a metering cycle, pilot impulse means in the controller actuated by the sequencing thereof for opening the inlet valve means only when the outlet valve means is closed and opening the outlet valve means only when the inlet valve means is closed, impulse conductors leading from the pilot impulse means in the controller to the inlet and outlet valves, impulse supply means for the impulse control means, and impulse conductors leading from the impulse control means to the controller actuating means for supplying actuating impulses to the controller as the valves and impulse control means are actuated.

22. The method of metering liquids including, admitting liquid to a chamber of known volume, sensing the filling of the chamber and creating an impulse to terminate the admission of liquid, sensing the termination of admission of liquid and creating a second impulse to institute draining of the chamber, sensing the emptying of the chamber and creating a third impulse to terminate the draining of liquid from the chamber, sensing the termination of draining of liquid and creating a fourth impulse to reinstitute the admission of liquid to the chamber, and counting the number of volumes of liquid passing through the chamber.

23. The method of metering liquids including, admitting liquid to a chamber of known volume, sensing the filling of the chamber and creating an impulse to terminate the admission of liquid, sensing the termination of admission of liquid and creating a second impulse to institute the sampling of the chamber contents, providing a time delay and creating a third impulse to terminate the sampling, sensing the termination of the sampling and creating a fourth impulse to institute draining of the chamber, sensing the emptying of the chamber and creating a fifth impulse to terminate the draining of liquid from the chamber, sensing the termination of draining of liquid and creating a sixth impulse to reinstitute the admission of liquid to the chamber, and counting the number of volumes of liquid passing through the chamber.

24. The method of metering liquids including, admitting liquid to a chamber of known volume, sensing the filling of the chamber and creating an impulse to terminate the admission of liquid, sensing the termination of admission of liquid and creating a second impulse to institute draining of the chamber, sensing the emptying of the chamber to create a pressure differential, sensing the pressure differential and creating a third impulse to terminate the draining of liquid from the chamber, sensing the termination of draining of liquid and creating a fourth impulse to reinstitute the admission of liquid to the chamber, and counting the number of volumes of liquid passing through the chamber.

25. The method of metering liquids including, admitting liquid to a chamber of known volume, sensing the filling of the chamber to create a pressure differential, sensing the pressure differential and creating an impulse to terminate the admission of liquid, sensing the termination of admission of liquid and creating a second impulse to institute draining of the chamber, sensing the emptying of the chamber to create a pressure differential, sensing the pressure differential and creating a third impulse to terminate the draining of liquid from the chamber, sensing the termination of draining of liquid and creating a fourth impulse to reinstitute the admission of liquid to the chamber, and counting the number of volumes of liquid passing through the chamber.

26. The method of metering liquids including, admitting liquid to a chamber of known volume, sensing the filling of the chamber and creating an impulse to terminate the admission of liquid, sensing the termination of admission of liquid and creating a second impulse to institute draining of the chamber, sensing the emptying of the chamber to cause a mechanical movement, sensing the mechanical movement and creating a third impulse to terminate the draining of liquid from the chamber, sensing the termination of draining of liquid and creating a fourth impulse to reinstitute the admission of liquid to the chamber, and counting the number of volumes of liquid passing through the chamber.

27. The method of metering liquids including, admitting liquid to a chamber of known volume, sensing the filling of the chamber to cause a mechanical movement, sensing the mechanical movement and creating an impulse to terminate the admission of liquid, sensing the termination of admission of liquid and creating a second impulse to institute draining of the chamber, sensing the emptying of the chamber to cause a mechanical movement, sensing the mechanical movement and creating a third impulse to terminate the draining of liquid from the chamber, sensing the termination of draining of liquid and creating a fourth impulse to reinstitute the admission of liquid to the chamber, and counting the number of volumes of liquid passing through the chamber.

28. The method as set forth in claim 22, and slowing the draining of liquid from the chamber near the moment of termination of draining.

29. The method as set forth in claim 22, and sensing the filling of the chamber by overflowing liquid from the chamber, and returning the overflowed liquid to the chamber prior to the institution of a subsequent draining step.

30. Metering means for measuring liquids including, a metering vessel of predetermined volume, inlet valve means for controlling admission of liquid to the metering vessel, outlet valve means for controlling the discharge of liquid from the vessel, and liquid level means responsive to the filling and emptying of the vessel for closing the inlet and outlet valve means, one of said means responsive to the filling or emptying of the vessel comprising a float ball and a valve seat through which fluid flows from the vessel and being responsive to the engaging of the seat by the float ball for actuating one of the valves.

31. The method of metering liquids including, admitting liquid to a chamber of known volume, sensing the filling of the chamber, terminating the admission of liquid and instituting draining of the chamber upon the sensing of the filling of the chamber, sensing the emptying of the chamber, terminating the draining and reinstituting the filling upon the sensing of the emptying of the chamber, passing fluid from the chamber through a valve seat in at least one of the filling and draining steps, guiding a liquid level responsive means into engagement with the seat as the liquid level in the chamber approaches the seat, the sensing being the sensing of engagement of the liquid level responsive means with the seat.

References Cited in the file of this patent

UNITED STATES PATENTS

| | | |
|---|---|---|
| 1,304,437 | Woodward | May 20, 1919 |
| 1,491,999 | Peterson | Apr. 29, 1924 |
| 2,158,381 | Raymond | May 16, 1939 |
| 2,648,225 | Hemmens | Aug. 11, 1953 |
| 2,662,549 | Rhinehart et al. | Dec. 15, 1953 |
| 2,723,682 | Haney et al. | Nov. 15, 1955 |
| 2,794,342 | Franklin | June 4, 1957 |
| 2,853,877 | Smith | Sept. 30, 1958 |
| 2,872,817 | Pitts | Feb. 10, 1959 |
| 2,882,724 | Smith | Apr. 21, 1959 |

OTHER REFERENCES

The Oil and Gas Journal, pp. 110, 111, April 8, 1957, 73-223.